United States Patent
Li et al.

(10) Patent No.: US 12,533,622 B2
(45) Date of Patent: Jan. 27, 2026

(54) INDIRECT EVAPORATIVE COOLING APPARATUS, COOLING SYSTEM, AND CONTROL METHOD

(71) Applicant: Huawei Digital Power Technologies Co., Ltd., Shenzhen (CN)

(72) Inventors: Jian Li, Xi'an (CN); Mingming Pu, Xi'an (CN); Zonghao Yang, Xi'an (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 300 days.

(21) Appl. No.: 18/340,257

(22) Filed: Jun. 23, 2023

(65) Prior Publication Data

US 2023/0330586 A1    Oct. 19, 2023

Related U.S. Application Data

(63) Continuation of application No. PCT/CN2020/139136, filed on Dec. 24, 2020.

(51) Int. Cl.
*B01D 53/02* (2006.01)
*B01D 46/00* (2022.01)
(Continued)

(52) U.S. Cl.
CPC ......... *B01D 46/70* (2022.01); *B01D 46/0086* (2013.01); *B01D 46/0087* (2013.01);
(Continued)

(58) Field of Classification Search
CPC ............ B01D 2273/10; B01D 2273/30; B01D 2279/50; B01D 46/0086; B01D 46/0087;
(Continued)

(56) References Cited

U.S. PATENT DOCUMENTS 6,176,305 B1 *  1/2001 Haglid .................. F28D 9/0081
                                                             165/250
6,282,915 B1 *  9/2001 Egbert .................. F24F 1/0067
                                                              62/304

(Continued)

FOREIGN PATENT DOCUMENTS

CN        101846374 A      9/2010
CN        108167990 A      6/2018
(Continued)

OTHER PUBLICATIONS

Translation of CN111425939 (Year: 2020).*

*Primary Examiner* — Christopher P Jones
(74) *Attorney, Agent, or Firm* — Conley Rose, P.C.

(57) ABSTRACT

An indirect evaporative cooling apparatus includes a housing, a heat exchanger core, a bypass valve, a filter, an indoor fan, and an outdoor fan. The heat exchanger core is in the housing. A first space, a second space, a third space, and a fourth space are formed by the heat exchanger core and the housing, and a first air vent, a second air vent, a third air vent, and a fourth air vent are disposed in the housing. The first space and the second space are connected by using the heat exchanger core to constitute an indoor circulation air duct, the third space and the fourth space are connected by using the heat exchanger core to constitute an outdoor circulation air duct.

20 Claims, 7 Drawing Sheets

(51) Int. Cl.
 *B01D 46/44* (2006.01)
 *B01D 46/70* (2022.01)
 *F24F 11/39* (2018.01)
 *F24F 13/28* (2006.01)

(52) U.S. Cl.
 CPC ............ *B01D 46/446* (2013.01); *F24F 11/39* (2018.01); *F24F 13/28* (2013.01); *B01D 2273/10* (2013.01); *B01D 2273/30* (2013.01); *B01D 2279/50* (2013.01)

(58) Field of Classification Search
 CPC ...... B01D 46/10; B01D 46/446; B01D 46/70; F24F 11/39; F24F 12/006; F24F 13/28; F24F 2221/22; F24F 5/0007; F24F 5/0035; F24F 8/90; H05K 7/20745; H05K 7/20827
 See application file for complete search history.

(56) References Cited

U.S. PATENT DOCUMENTS

| | | | |
|---|---|---|---|
| 10,337,758 B2* | 7/2019 | Iio | F24F 11/74 |
| 2006/0151165 A1* | 7/2006 | Poirier | F24F 12/006 |
| | | | 165/59 |
| 2011/0195652 A1* | 8/2011 | Smith | F24F 11/38 |
| | | | 454/251 |
| 2018/0051896 A1* | 2/2018 | Swindon | F24F 1/0007 |

FOREIGN PATENT DOCUMENTS

| | | |
|---|---|---|
| CN | 111425939 A | 7/2020 |
| CN | 112066500 A | 12/2020 |
| CN | 212081616 U | 12/2020 |
| KR | 20120001982 A | 1/2012 |
| KR | 20200001707 U | 7/2020 |

\* cited by examiner

INDIRECT EVAPORATIVE COOLING APPARATUS, COOLING SYSTEM, AND CONTROL METHOD

CROSS-REFERENCE TO RELATED APPLICATIONS

This is a continuation of International Patent Application No. PCT/CN2020/139136 filed on Dec. 24, 2020, the disclosure of which is hereby incorporated by reference in its entirety.

TECHNICAL FIELD

The present disclosure relates to the field of data center heat dissipation technologies, and in particular, to an indirect evaporative cooling apparatus, a data center cooling system with an indirect evaporative cooling apparatus, and a control method for the indirect evaporative cooling apparatus.

BACKGROUND

In the field of data center heat dissipation, because a cooling device such as an air conditioner needs to be used, filth blockage may occur on an outdoor unit due to catkins in spring, dust, and the like, finally resulting in poor heat dissipation, a poor refrigeration effect, or a refrigeration failure. At present, manual cleaning is mainly used in the industry. This is relatively costly and also has low time validity.

SUMMARY

Embodiments of this application provide an indirect evaporative cooling apparatus, to control an internal air duct of the indirect evaporative cooling apparatus to clean a filter by using a reverse blowing mode, achieving advantages of low costs and high time validity.

According to one aspect, this application provides an indirect evaporative cooling apparatus, including a housing, a heat exchanger core, a bypass valve, a filter, an indoor fan, and an outdoor fan. The heat exchanger core is in the housing. A first space, a second space, a third space, and a fourth space are formed by the heat exchanger core and the housing. A first air vent connecting the first space and the outside of the housing, a second air vent connecting the second space and the outside of the housing, a third air vent connecting the third space and the outside of the housing, and a fourth air vent connecting the fourth space and the outside of the housing are disposed in the housing. The first space and the second space are connected by using the heat exchanger core to constitute an indoor circulation air duct, the third space and the fourth space are connected by using the heat exchanger core to constitute an outdoor circulation air duct, the indoor fan is disposed in the indoor circulation air duct, the outdoor fan is disposed in the outdoor circulation air duct, the filter is disposed at the third air vent, and the bypass valve is disposed between the first space and the third space, so that wind in the indoor circulation air duct can enter the third space through the bypass valve and blow toward the filter. In this application, an internal air duct of the indirect evaporative cooling apparatus is used to clean the filter through blowing toward the filter from the inside to the outside, so that advantages of low costs and high time validity are achieved.

Specifically, the first space and the second space are connected by using the heat exchanger core to constitute the indoor circulation air duct, and the indoor fan provides air flowing power inside the indoor circulation air duct. The third space and the fourth space are also connected by using the heat exchanger core to constitute the outdoor circulation air duct, and the outdoor fan provides air flowing power inside the outdoor circulation air duct. One of functions of the heat exchanger core is to facilitate heat exchange between the indoor circulation air duct and the outdoor circulation air duct, to achieve a refrigeration or heating effect. In this application, the bypass valve is disposed between the first space and the third space, and the bypass valve is configured to open or close a reverse blowing channel. On the reverse blowing channel, an air flow in the first space flows to the third space through the bypass valve and blows toward the filter. In an implementation, the bypass valve is an air valve, specifically, an air valve like shutters, and this type of air valve has a relatively large flow rate. In this application, air may be controlled to flow from the first space to the third space by adjusting a wind speed difference between the indoor circulation air duct and the outdoor circulation air duct, so that air at the filter at the third air vent in the third space flows reversely. In this application, a reverse blowing mode can be used, in other words, reversely flowing air can be used to blow away filth (for example, catkins and dust) accumulated at the filter, so that the filter is cleaned.

In a possible implementation, the indoor fan is located in the first space. It may be understood that a bracket may be disposed in the first space to fasten the indoor fan. As a source of air flowing power in the indoor circulation air duct, the indoor fan mainly provides power for air flowing in the indoor circulation air duct. When the filter needs to be cleaned, the indoor fan also needs to provide power for air flowing from the first space to the third space. Herein, the indoor fan is disposed in the first space to increase wind pressure (atmospheric pressure) of the first space, so that an air velocity at the filter on a side of the first space is increased. In this case, provided that an air velocity at the filter on a side of the third space is made less than the air velocity on the side of the first space, positive pressure from the first pace to the third space is generated at the bypass valve, to ensure that air flows from the first space to the third space.

In a possible implementation, the indoor fan is located at the first air vent, and "at the first air vent" may be understood as a position in the first air vent or a position that is in the first space and that is adjacent to the first air vent. In this implementation, a position of the indoor fan is combined with or associated with a position of the first air vent, and the indoor fan may be directly fastened to the housing without requiring a bracket structure.

In a possible implementation, the indoor fan is located in the second space. It may be understood that a bracket may be disposed in the second space to fasten the indoor fan. In this embodiment, because the second space and the first space are connected by using the heat exchanger core to constitute the indoor circulation air duct, when the indoor fan located in the second space runs, an air velocity in the first space is increased, and correspondingly, an air velocity at the filter on a side of the first space is increased, and positive pressure from the first space to the third space is generated at the bypass valve, to ensure that air flows from the first space to the third space.

In a possible implementation, the indoor fan is located at the second air vent, and "at the second air vent" may be understood as a position in the second air vent or a position that is in the second space and that is adjacent to the second air vent. In this implementation, a position of the indoor fan is combined with or associated with a position of the second air vent, and the indoor fan may be directly fastened to the housing without requiring a bracket structure.

In a possible implementation, the outdoor fan is located in the fourth space, and a bracket structure may be disposed in the fourth space to fasten the outdoor fan. A function of the outdoor fan is to provide power for the outdoor circulation air duct. When normal ventilation and heat dissipation are performed, the outdoor fan is in a normal operation mode. When a filter cleaning operation needs to be performed, the outdoor fan may be closed or power of the outdoor fan may be reduced, to reduce an air velocity in the outdoor circulation air duct, and reduce a corresponding air velocity in the third space. In this case, the air velocity at the filter on the side of the third space is reduced, and positive pressure from the first space to the third space is generated at the bypass valve, so that air flows from the first space to the third space, to complete cleaning the filter.

In a possible embodiment, the outdoor fan is located at the fourth air vent. It may be understood that the outdoor fan may be located in the fourth air vent, or may be located at a position that is in the fourth space and that is adjacent to the fourth air vent. In this implementation, the outdoor fan may be directly fastened to the housing without requiring a fastening bracket.

In a possible embodiment, an outdoor air valve is disposed at the fourth air vent, and is configured to control opening and closing of the fourth air vent. When the fourth air vent is blocked by the outdoor air valve, and circulation in the outdoor circulation air duct is blocked, an air velocity in the third space is reduced. This helps positive pressure from the first space to the third space to be generated at the bypass valve, so that air flows from the first space to the third space, to complete cleaning the filter.

In a possible embodiment, an indoor air valve is disposed at the second air vent, and is configured to control opening and closing of the second air vent. When a filter cleaning operation is performed, the second air vent is closed by using the indoor air valve, so that air circulation from the first space to the second space is blocked. In this case, when the indoor fan in the first space runs, air inside the first space flows to the third space through the bypass valve, in other words, positive pressure from the first space to the third space is generated at the bypass valve, so that air flows from the first space to the third space, to complete cleaning the filter.

In a possible embodiment, the first space, the fourth space, the second space, and the third space are counterclockwise distributed around the heat exchanger core.

In a possible embodiment, the first space, the second space, the fourth space, and the third space are counterclockwise distributed around the heat exchanger core. A difference between this embodiment and the foregoing embodiment lies in position distribution of the second space and the fourth space. This may be selected based on a specific implementation solution. It should be noted that the first space and the third space are also adjacent to each other in this embodiment. In this case, the bypass valve is disposed between the first space and the third space, to facilitate air circulation between the first space and the third space.

In a possible embodiment, a filth blockage monitor is disposed in the third space, and is configured to send a signal to a control center when filth blockage occurs on the filter. The filth blockage monitor in this embodiment is configured to detect filth blockage of the filter. When detecting that the filth blockage affects normal operation of the normal outdoor circulation air duct, the filth blockage monitor sends a signal to the control center, so that the control center enables a filth removal mode. It should be noted that the control center herein may be a control circuit disposed on a circuit board.

In a possible embodiment, the filth blockage monitor includes a differential pressure sensor or a light transmittance sensor. In a specific embodiment, the filth blockage monitor may be a differential pressure sensor or a light transmittance sensor as actually required.

When the filth blockage monitor is a differential pressure sensor, the filth blockage monitor can detect atmospheric pressure in the third space. If the filter at the third air vent corresponding to the third space is blocked, and the outdoor fan still runs, air in the third space is continuously pumped to the fourth space, and less air is supplemented from the third air vent, and consequently, negative pressure is formed in the third space. After detecting the negative pressure in the third space, the filth blockage monitor sends an electrical signal to the control center, to indicate, to the control center, that the filth removal mode needs to be enabled for the indirect evaporative cooling apparatus.

Similarly, when the filth blockage monitor is a light transmittance sensor, the light transmittance sensor detects filth blockage of the filter based on light transmittance of the filter. Specifically, if the filter is blocked due to dust or the like, light transmittance is reduced because the corresponding filter is blocked by dust. Lower light transmittance means more serious filth blockage. When the light transmittance reaches a predetermined value, the light transmittance sensor sends an electrical signal to the control center, and the control center enables the filth removal mode.

This application further provides a cooling system, including a data center and the foregoing indirect evaporative cooling apparatus. An indoor circulation air duct in the indirect evaporative cooling apparatus is connected to the data center. A function of the indirect evaporative cooling apparatus provided in this application is to adjust a temperature of the data center. It may be understood that the data center is connected to the indoor circulation air duct, and when the temperature of the data center is excessively high, heat is transferred to an outdoor circulation air duct by using the indoor circulation air duct and a heat exchanger core, so that excess heat is transferred to the outside. Similarly, when the temperature of the data center is excessively low, the outdoor circulation air duct transfers heat of the outside to the data center by using the heat exchanger core and the indoor circulation air duct, to prevent the temperature of the data center from being excessively low and affecting normal operation.

In a specific embodiment, the cooling system further includes a control center, and the control center is configured to control an operation mode of the indirect evaporative cooling apparatus. In an implementation, a function of the control center is to adjust an indoor fan, an outdoor fan, an outdoor air valve, an indoor air valve, and a bypass valve in the cooling system to be opened. During normal use, the indoor fan, the outdoor fan, the outdoor air valve, and the indoor air valve are opened, and the bypass valve is closed. In this case, the indoor circulation air duct and the outdoor circulation air duct operate to exchange heat by using the heat exchanger core. When the control center needs to perform a filth removal operation, open states of the indoor fan, the outdoor fan, the outdoor air valve, and the indoor air valve are selected based on different modes, and the bypass valve is opened, to ensure that air in a first space enters a third space through the bypass valve, and reversely flows out from a third air vent in the third space to remove filth on a filter in the form of wind power.

In a specific embodiment, the control center is electrically connected to a filth blockage monitor in the indirect evaporative cooling apparatus, and the control center is configured to receive an electrical signal of the filth blockage monitor; and when the electrical signal falls within a preset range, the control center controls the indirect evaporative cooling apparatus to be in a heat dissipation operation mode; or when the electrical signal falls beyond the preset range, the control center controls the indirect evaporative cooling apparatus to be in a filth removal operation mode of the filter. In this embodiment, level-based processing is performed with regard to filth blockage of the filter. In other words, the filter is cleaned only when the filth blockage affects normal operation. It may be understood that whether the filth removal mode is enabled depends on whether the control center receives the electrical signal of the filth blockage monitor. When the electrical signal falls within the preset range, no filth removal processing needs to be performed on the filter, and in this case, the cooling apparatus is still in the heat dissipation operation mode. When the electrical signal falls beyond the preset range, it indicates that filth removal processing needs to be performed on the filter, and in this case, the cooling apparatus enters the filth removal operation mode of the filter, that is, enters the filth removal operation mode.

In a specific embodiment, when the electrical signal falls beyond the preset range, the control center controls the outdoor fan to stop running, and opens the bypass valve, so that wind in the indoor circulation air duct enters the third space through the bypass valve and blows toward the filter. In this embodiment, when the electrical signal falls beyond the preset range, the control center enters the filth removal mode. Specifically, the control center controls the outdoor fan to stop running, and opens the bypass valve, so that wind in the indoor circulation air duct enters the third space through the bypass valve and blows toward outdoor space through the filter at the third air vent, to remove filth on the filter by using a reverse air flow.

According to another aspect, this application further provides a control method, used to control an operation mode of the foregoing indirect evaporative cooling apparatus. The control method includes: monitoring filth blockage of a filter; and when the filth blockage falls within a preset range, controlling the indirect evaporative cooling apparatus to be in a heat dissipation operation mode; or when the filth blockage falls beyond the preset range, controlling a rotation speed of an outdoor fan to be reduced or the outdoor fan to stop running, and opening a bypass valve, so that wind in an indoor circulation air duct enters a third space through the bypass valve and blows toward a filter. In this embodiment, when the indirect evaporative cooling apparatus is used normally, the filter may be covered and blocked due to filth (such as dust) in outdoor air. The filth blockage is monitored by using a filth blockage monitor. When the filth blockage falls beyond the preset range, in other words, when the filth blockage affects normal operation of the indirect evaporative cooling apparatus, the rotation speed of the outdoor fan is reduced or the outdoor fan stops running, and the bypass valve is opened. In this way, the wind in the indoor circulation air duct enters the third space through the bypass valve and blows toward the filter, to implement filth removal processing on the filter by using the reverse air flow.

In a possible implementation, the filth blockage of the filter is represented by a pressure value in the third space; and when the pressure value falls within a preset range, the indirect evaporative cooling apparatus is controlled to be in the heat dissipation operation mode; or when the pressure value falls beyond the preset range, the rotation speed of the outdoor fan is controlled to be reduced or the outdoor fan is controlled to stop running, and the bypass valve is opened, so that the wind in the indoor circulation air duct enters the third space through the bypass valve and blows toward the filter. In an implementation, the filth blockage monitor is a differential pressure sensor, and the differential pressure sensor can sense the pressure value in the third space. It may be understood that when the filter at a third air vent is blocked by filth, abnormality of the pressure in the third space is inevitable, and in this case, the pressure abnormality is detected by the differential pressure sensor. After detecting the pressure abnormality (falling beyond a preset range), the control center controls the rotation speed of the outdoor fan to be reduced or the outdoor fan to stop running, and opens the bypass valve. It may be understood that after the bypass valve is opened, air flows from the first space to the third space, and air inside the third space is increased. In this case, the air flows from the third air vent to the outside, in other words, a reverse air flow is formed, to perform filth removal processing on the filter.

In a possible implementation, when the pressure change falls beyond the preset range, a timing module is enabled; within preset time, the rotation speed of the outdoor fan is controlled to be reduced or the outdoor fan is controlled to stop running, and the bypass valve is opened, so that the wind in the indoor circulation air duct enters the third space through the bypass valve and blows toward the filter; and after the outdoor fan has not run for the preset time, the bypass valve is closed, and the outdoor fan is opened or the rotation speed of the outdoor fan is restored. In this implementation, the operation mode of the indirect evaporative cooling apparatus is switched between the heat dissipation mode and a cleaning mode. When the pressure change falls beyond the preset range, the cleaning mode is entered under the action of the control center. Cleaning is timed in the cleaning mode, in other words, the timing mode is enabled. In this way, when the indirect evaporative cooling apparatus has enabled the cleaning mode for the preset time, the outdoor fan is opened again and the bypass valve is closed, so that the heat dissipation mode is entered.

In a possible implementation, after the rotation speed of the outdoor fan is controlled to be reduced or the outdoor fan is controlled to stop running, and the bypass valve is opened, the pressure value in the third space is continuously monitored; and when the pressure value changes and falls within a safe range, the bypass valve is closed, and the outdoor fan is opened or the rotation speed of the outdoor fan is restored. The safe range is included in the preset range, and a boundary value of the safe range is less than a boundary value of the preset range. In an implementation, in the cleaning mode, the differential pressure sensor continuously detects the pressure value in the third space. When the differential pressure sensor detects that the pressure value in the third space changes and falls within the safe range, it indicates that filth on the filter has been cleaned up or a cleaning degree meets an operation requirement. In this case, the bypass valve is closed, and the outdoor fan is opened or the rotation speed of the outdoor fan is restored. In this case, the indirect evaporative cooling apparatus is switched from the cleaning mode to the normal heat dissipation mode.

In a possible implementation, when the pressure change falls beyond the preset range, a rotation speed of an indoor fan is increased to improve cleaning efficiency of the filter.

DESCRIPTION OF EMBODIMENTS

The following describes embodiments of the present disclosure with reference to accompanying drawings.

Figure 1:
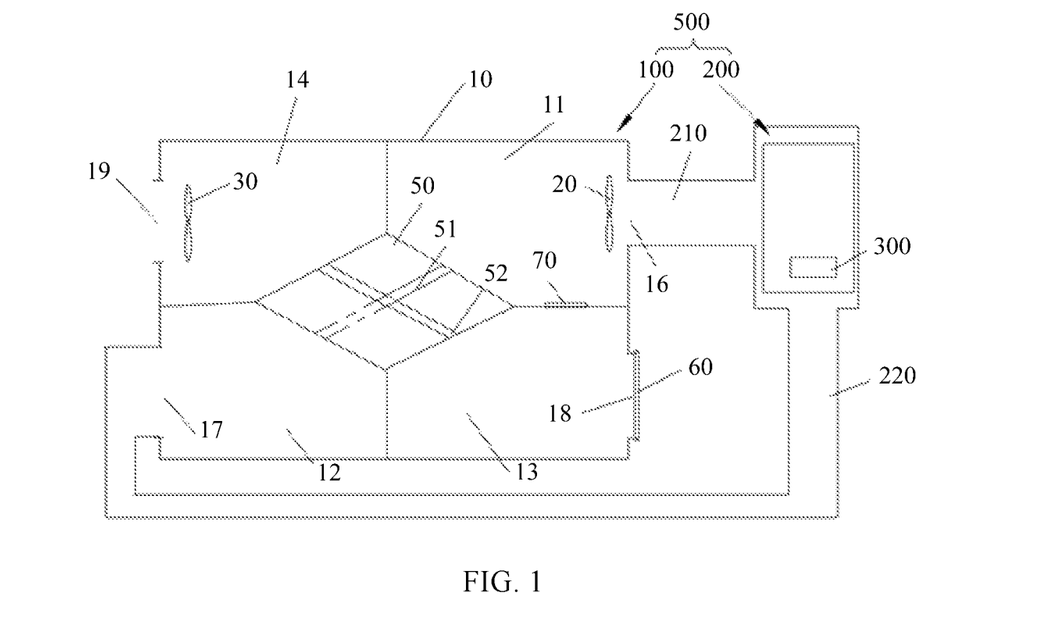
FIG. 1 is a schematic diagram of a cooling system according to an implementation of this application.

Refer to FIG. 1. An indirect evaporative cooling apparatus 100 provided in this application is applied to a cooling system 500. In an implementation, the cooling system 500 includes the indirect evaporative cooling apparatus 100 and a data center 200. The data center 200 may be understood as a heating source in the cooling system 500 because a temperature inside the data center 200 rises when the data center 200 operates normally, and correspondingly, the indirect evaporative cooling apparatus 100 is configured to perform heat dissipation processing on the data center 200. The data center 200 may be a base station or an equipment room, or may be another environment in which heat dissipation is required. The data center 200 may include a control center 300. The control center 300 is configured to control running of an electronic device in the data center 200, and the control center 300 may also be configured to control running of the indirect evaporative cooling apparatus 100. The data center 200 shown in FIG. 1 is merely a schematic representation, and does not represent a size, a shape, and a position of the data center 200 provided in this application. Similarly, the indirect evaporative cooling apparatus 100 shown in FIG. 1 cannot limit a shape, a size, and a position of the indirect evaporative cooling apparatus 100 provided in this application.

In a possible implementation, the indirect evaporative cooling apparatus 100 provided in this application includes a housing 10, an indoor fan 20, an outdoor fan 30, a heat exchanger core 50, a filter 60, and a bypass valve 70. The housing 10 forms an enclosed interior space, the heat exchanger core 50 is fastened in the enclosed space in the housing 10, and a first space 11, a second space 12, a third space 13, and a fourth space 14 are formed by the heat exchanger core 50 and the housing 10. It may be understood that the first space 11, the second space 12, the third space 13, and the fourth space 14 are distributed around the heat exchanger core 50, forming four independent spaces, and two adjacent independent spaces are separated by using a spacer in the housing 10. Four air vents connecting the enclosed space in the housing 10 and the outside of the housing 10 are disposed in the housing 10. The four air vents are a first air vent 16 connected between the first space 11 and the outside of the housing 10, a second air vent 17 connected between the second space 12 and the outside of the housing 10, a third air vent 18 connected between the third space 13 and the outside of the housing 10, and a fourth air vent 19 connected between the fourth space 14 and the outside of the housing 10.

In an implementation shown in FIG. 1, the first space 11, the fourth space 14, the second space 12, and the third space 13 are counterclockwise distributed around the heat exchanger core. The first air vent 16 and the third air vent 18 are located on a first side of the housing 10, the second air vent 17 and the fourth air vent 19 are located on a second side of the housing 10, and the first side and the second side are disposed opposite to each other. In this implementation, the first air vent 16 and the fourth air vent 19 are disposed opposite to each other, and the third air vent 18 and the second air vent 17 are disposed opposite to each other.

Figure 2:
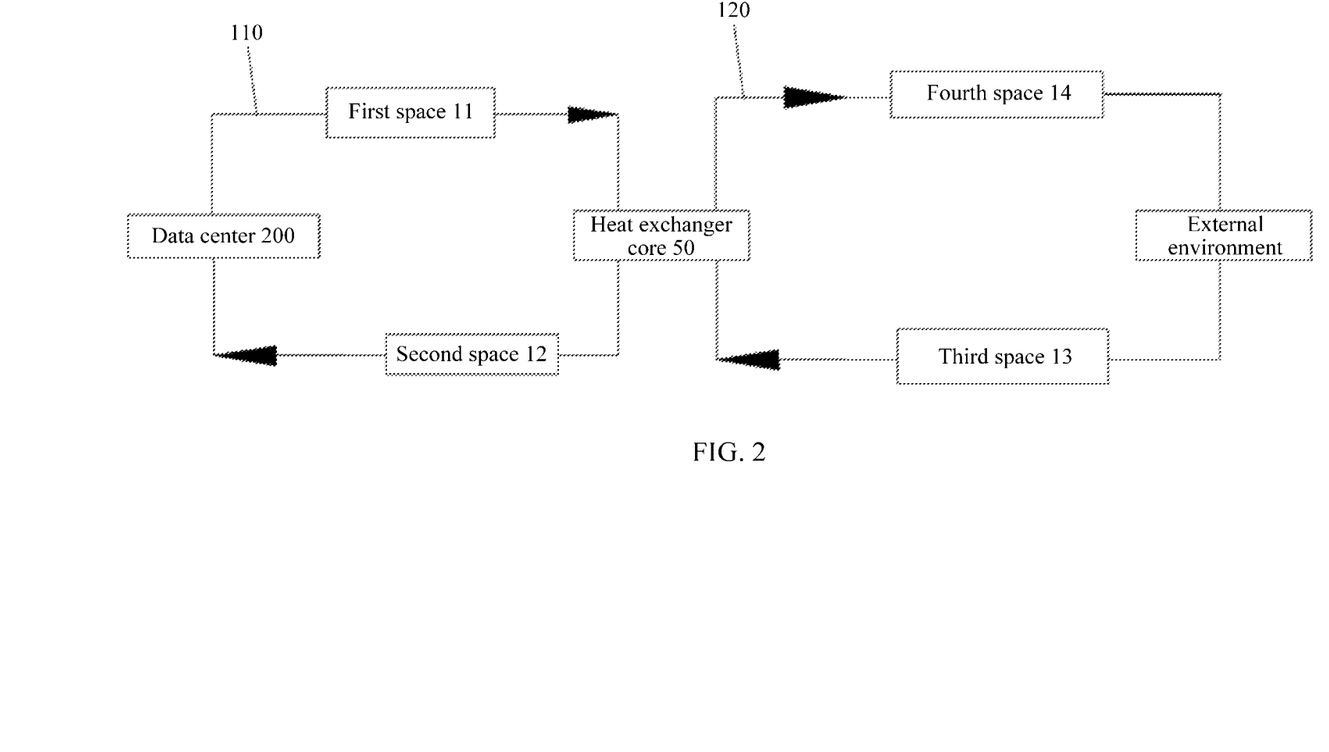
FIG. 2 is a schematic diagram of an indoor circulation air duct and an outdoor circulation air duct in a cooling system according to an implementation of this application.

With reference to FIG. 1 and FIG. 2, the first space 11 and the second space 12 are connected by using the heat exchanger core 50 to constitute an indoor circulation air duct 110. A path in which an air flow flows in the indoor circulation air duct 110 is as follows: The air flow enters the first space 11 of the indirect evaporative cooling apparatus 100 from the data center 200 through the first air vent 16, then enters the second space 12 after passing through the heat exchanger core 50, and then returns to the data center 200 after flowing out of the indirect evaporative cooling apparatus 100 through the second air vent 17, forming a circulating air flow. Specifically, the data center 200 is externally connected to two air conduits, namely, a first air conduit 210 and a second air conduit 220. The two air conduits are respectively connected to the first air vent 16 and the second air vent 17. In this way, starting from the data center 200, the air flow passes through the first air conduit 210, then passes through the first air vent 16, the first space 11, the heat exchanger core 50, the second space 12, and the second air vent 17, and finally passes through the second air conduit 220 to return to the data center 200, forming a heat dissipation loop. The indoor fan 20 is disposed in the indoor circulation air duct 110, and is configured to provide power for air to flow in the heat dissipation loop.

The third space 13 and the fourth space 14 are connected by using the heat exchanger core 50 to constitute an outdoor circulation air duct 120. A path in which an air flow flows in the outdoor circulation air duct 120 is as follows: The air flow coming from the outside enters the third space 13 through the third air vent 18, then enters the fourth space 14 after passing through the heat exchanger core 50, and then flows out of the housing 10 of the indirect evaporative cooling apparatus 100 through the fourth air vent 19 to reach the outside, forming a circulating air flow. The outdoor fan 30 is disposed in the outdoor circulation air duct 120, and provides power for outdoor air to enter the outdoor circulation air duct 120.

Specifically, in the implementation shown in FIG. 1, the heat exchanger core 50 includes a first channel 51 and a second channel 52, the first channel 51 and the second channel 52 cross, the first channel 51 is connected between the first space 11 and the second space 12, and the second channel 52 is connected between the third space 13 and the fourth space 14. The indoor fan 20 is located in the first space 11. It may be understood that a bracket may be disposed in the first space 11, and the bracket is connected to the housing and is configured to fasten the indoor fan 20. The outdoor fan 30 is located in the fourth space 14. Similarly, a bracket structure may be disposed in the fourth space 14 to fasten the outdoor fan 30.

To prevent filth such as dust or catkins in outdoor air from entering the outdoor circulation air duct 120, a filter 60 is disposed at the third air vent 18. In an implementation, the filter 60 is fastened to the housing 10. In an implementation, the filter 60 is detachably connected to the housing 10. Alternatively, the filter 60 may be connected to a filter replacement apparatus. The filter replacement apparatus is installed on the housing 10. When the filter is severely damaged and cannot be used, the filter replacement apparatus may be operated to replace the filter 60 without disassembling. The filter replacement apparatus may be a structure like a roller, and a motor may drive the roller to rotate to implement replacement of the filter 60.

The bypass valve 70 is disposed between the first space 11 and the third space 13. Specifically, the bypass valve 70 is disposed on a spacer between the first space 11 and the third space 13. The bypass valve 70 is configured to connect the first space 11 and the third space 13, so that the first space 11 and the third space 13 jointly form a reverse blowing channel. A path of the reverse blowing channel is as follows: Wind enters the first space 11 from the first air vent 16, enters the third space 13 through the bypass valve 70, and then blows toward the third air vent 18, in other words, blows toward the filter 60.

The indirect evaporative cooling apparatus 100 provided in this application includes two operation modes: heat dissipation and filth removal. Generally, the indirect evaporative cooling apparatus 100 implements heat dissipation processing on the data center 200 through circulation of the indoor circulation air duct 110 and the outdoor circulation air duct 120, and the operation mode is the heat dissipation operation mode. However, when the filter 60 in the indirect evaporative cooling apparatus 100 is blocked because the heat dissipation mode has been enabled for relatively long duration, the filth removal operation mode is enabled to perform filth removal processing on the filter 60, to improve heat dissipation and refrigeration effects of the indirect evaporative cooling apparatus 100 in the heat dissipation mode.

Figure 3:
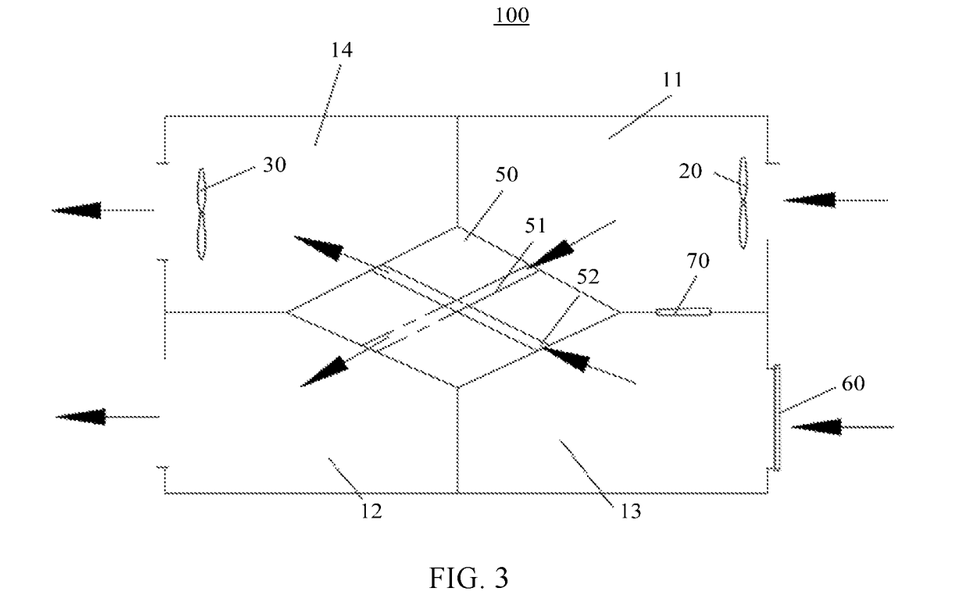
FIG. 3 is a schematic diagram of an air flow in an indirect evaporative cooling apparatus in a heat dissipation operation mode according to an implementation of this application.

FIG. 3 is a schematic diagram of an air flow in the indirect evaporative cooling apparatus 100 provided in this application in the heat dissipation operation mode. A direction of an arrow in FIG. 3 is a direction of an air flow. In the heat dissipation operation mode, the indoor fan 20 operates normally, and air in the indoor circulation air duct 110 is driven to flow when an indoor fan 20 rotates. Similarly, the outdoor fan 30 operates normally, and air in the outdoor circulation air duct 120 is driven to flow when the outdoor fan 30 rotates. A temperature rises as the data center 200 operates normally. In the heat dissipation operation mode, under the action of the indoor fan 20, air carrying heat leaves the data center 200 to enter the first air conduit 210, and then enters the first space 11 through the first air vent 16. When the air carrying heat passes through the heat exchanger core 50, the heat exchanger core 50 transfers the heat from air of the indoor circulation air duct 110 to air of the outdoor circulation air duct 120, in other words, the heat enters the fourth space 14 through the heat exchanger core 50, and then enters outside air through the fourth air vent 19 connected between the fourth space 14 and the outside. In this way, the heat is transferred from the data center 200 to the outside by using the indoor circulation air duct 110, the heat exchanger core 50, and the outdoor circulation air duct 120.

Figure 4:
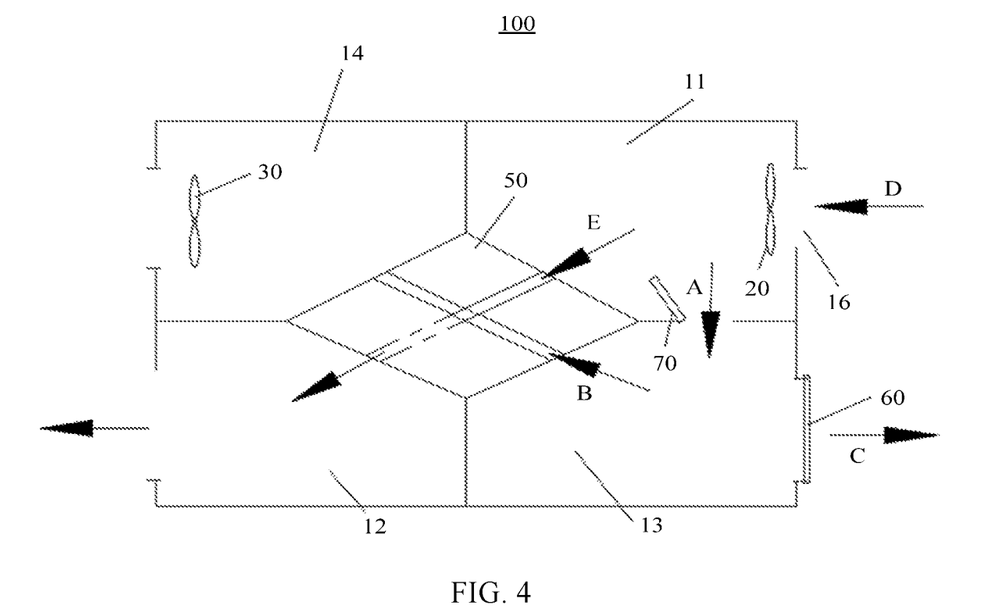
FIG. 4 is a schematic diagram of an air flow in an indirect evaporative cooling apparatus in a filth removal mode according to an implementation of this application.

In the filth removal mode, refer to FIG. 4. The bypass valve 70 between the first space 11 and the third space 13 is opened, so that an air flow flows from the first space 11 to the third space 13. The open state of the bypass valve 70 shown in FIG. 4 is merely a schematic representation, and does not indicate that the bypass valve 70 is opened in this way. It may be understood that the bypass valve 70 may be an air valve, specifically, an air valve with a structure like shutters, and the bypass valve has a relatively large flow rate, so that a relatively large amount of wind can enter the third space 13 and blow toward the filter 60. In this application, rotation speeds of the indoor fan 20 and the outdoor fan 30 may be increased, so that an air flow flowing from the first space 11 to the third space 13 has a higher wind speed, thereby improving cleaning efficiency of the filter 60. An air flow flowing from the first space 11 to the third space 13 flows in two directions: One part enters the fourth space 14 from the third space 13 through the heat exchanger core 50; and the other part flows to the outside from the third air vent 18 connected between the third space 13 and the outside. In this application, filth on the filter 60 at the third air vent 18 is removed through reverse flowing of the air flow. Therefore, in the filth removal mode, in this application, positive atmospheric pressure from the first space 11 to the third space 13 can be generated at the bypass valve 70. The indoor fan 20 needs to continuously operate to ensure that positive atmospheric pressure output to the third space 13 exists in the first space 11. Correspondingly, a rotation speed of the outdoor fan 30 may be reduced or the outdoor fan 30 may stop running. In other words, in an implementation, the outdoor fan 30 is closed, so that the outdoor circulation air duct 120 is closed. In another implementation, the rotation speed of the outdoor fan is reduced to reduce atmospheric pressure in the third space 13.

Specifically, the air carrying heat in the data center 200 forms an air flow D at the first air vent 16 under the action of the indoor fan 20. After entering the first space 11, the air flow D flows in two directions. One part enters the second space through the heat exchanger core 50, and the air flow is E. The other part enters the third space 13 through the bypass valve 70, and the corresponding air flow is A. The air flow A that enters the third space 13 through the bypass valve 70 may be divided. One part passes through the filter 60 from the third air vent 18, and flows to the outside, to form an air flow C. The other part may enter the fourth space 14 through the heat exchanger core 50. It may be understood that the third space 13 in this case may be understood as a three-way valve, and the three-way valve is connected to the first space 11 by using the bypass valve 70; is connected to the fourth space 14 by using the heat exchanger core 50, and is connected to the outside by using the third air vent 18. In the filth removal mode, an air flow needs to flow from the third air vent 18 to the outside. In this case, inside the third space 13, directions of the air flow A that enters the third space 13 from the first space 11 through the bypass valve 70 and the air flow C that flows from the third space 13 to the outside through the third air vent 18 are determined, and a direction of the air flow B that flows from the third space 13 to the fourth space 14 through the heat exchanger core 50 is undetermined. It may be understood that to ensure existence of the outflow air flow C, the air flow A needs to be greater than the air flow B. To ensure the existence of the air flow C, the air flow A needs to be greater than the air flow B. Because a size of the inflow air flow A is related to operation of the indoor fan 20, and a size of the outflow air flow B is related to operation of the outdoor fan 30, the corresponding indoor fan 20 may still operate normally, while the outdoor fan 30 stops running or the rotation speed of the outdoor fan 30 is reduced. "Inflow" and "outflow" are described relative to the third space 13. For specific directions, refer to directions of arrows.

In some other embodiments, a position of the indoor fan 20 or the outdoor fan 30 may be adjusted, or a valve may be disposed beside different air vents (the first air vent 16, the second air vent 17, the third air vent 18, or the fourth air vent 19).

Figure 5:
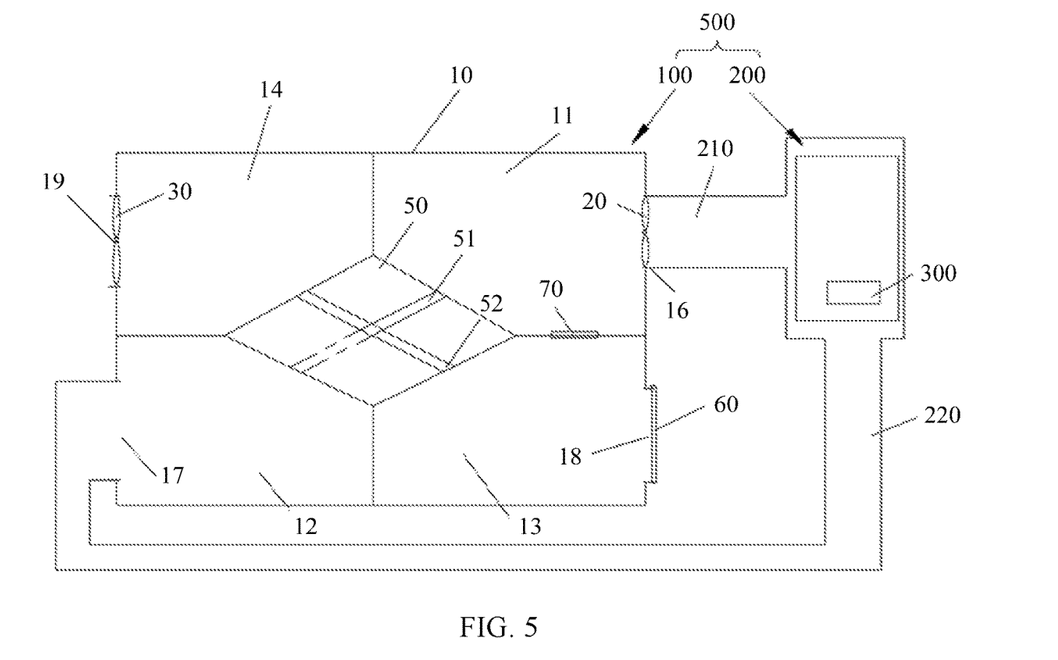
FIG. 5 is a schematic diagram of an indirect evaporative cooling apparatus according to an implementation of this application.

FIG. 5 shows a possible implementation of the indirect evaporative cooling apparatus 100 provided in this application. A difference between the indirect evaporative cooling apparatus 100 in this implementation and the indirect evaporative cooling apparatus 100 shown in FIG. 1 is positions at which the indoor fan 20 and the outdoor fan 30 are disposed. In this implementation, the indoor fan 20 is located at the first air vent 16. "At the first air vent 16" may be understood as a position inside the first air vent 16 or a position that is in the first space 11 and that is adjacent to the first air vent 16. It may be understood that the first air vent 16 is a cylindrical channel. An inner wall of the channel may be configured to install the indoor fan 20. Alternatively, the indoor fan 20 may not be located in the channel, but located at the position that is in the first space 11 and that is adjacent to the first air vent 16. The indoor fan 20 may be installed at an inner surface of the housing 10. In this implementation, the position of the indoor fan 20 is combined with or associated with a position of the first air vent 16, and the indoor fan 20 may be directly fastened to the housing 10 without requiring a bracket structure. Correspondingly, the outdoor fan 30 is located at the fourth air vent 19. It may be understood that the outdoor fan 30 may be located in the fourth air vent 19, or may be located at a position that is in the fourth space 14 and that is adjacent to the fourth air vent 19. In this embodiment, the outdoor fan 30 may be directly fastened to the housing 10 without requiring a fastening bracket.

Figure 6:
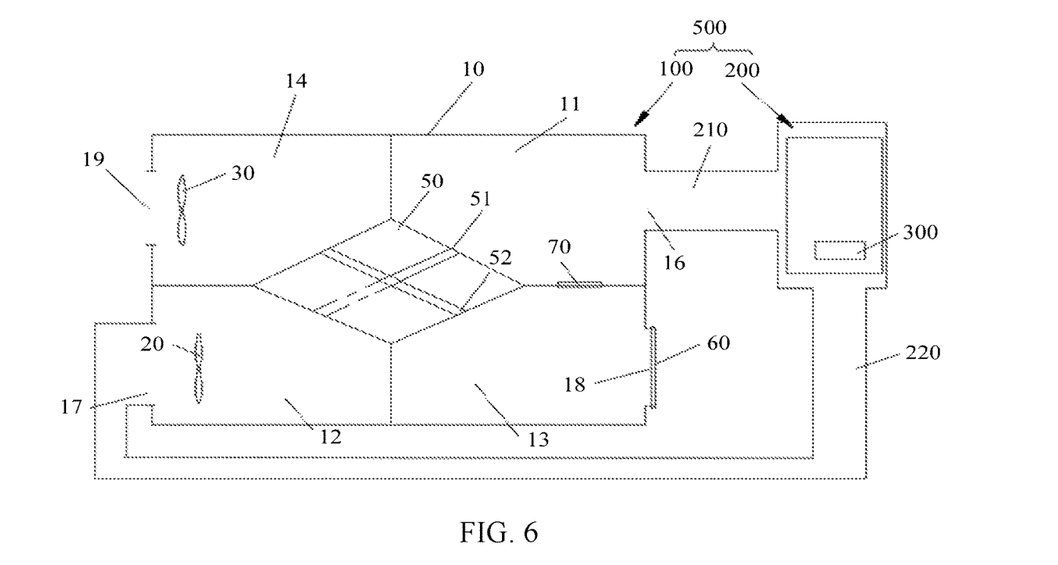
FIG. 6 is a schematic diagram of an indirect evaporative cooling apparatus according to an implementation of this application.

FIG. 6 shows a possible implementation of the indirect evaporative cooling apparatus 100 provided in this application. A difference between the indirect evaporative cooling apparatus 100 in this implementation and the indirect evaporative cooling apparatus 100 shown in FIG. 1 is a position at which the indoor fan 20 is disposed. In this implementation, the indoor fan 20 is located in the second space 12. It may be understood that a bracket may be disposed in the second space 12 to fasten the indoor fan 20. In this embodiment, because the second space 12 and the first space 11 are connected by using the heat exchanger core 50 to constitute the indoor circulation air duct, when the indoor fan 20 located in the second space 12 runs, an air velocity in the first space 11 is increased, and correspondingly, an air velocity at the filter 60 on a side of the first space 11 is increased, and positive pressure from the first space 11 to the third space 13 is generated at the bypass valve 70, to ensure that air flows from the first space 11 to the third space 13.

Figure 7:
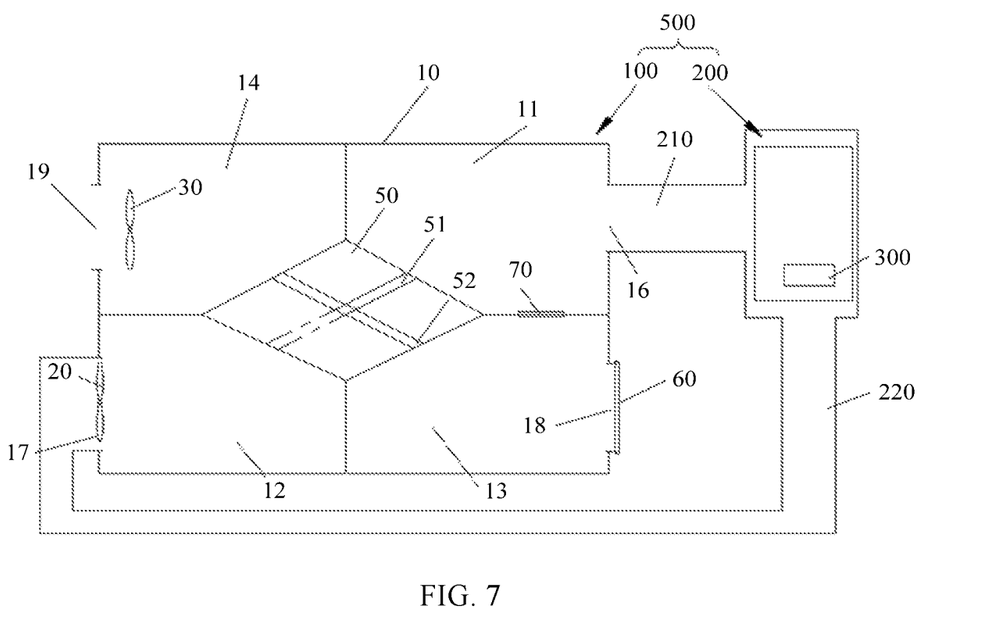
FIG. 7 is a schematic diagram of an indirect evaporative cooling apparatus according to an implementation of this application.

FIG. 7 shows a possible implementation of the indirect evaporative cooling apparatus 100 provided in this application. A difference between the indirect evaporative cooling apparatus 100 in this implementation and the indirect evaporative cooling apparatus 100 shown in FIG. 1 is a position at which the indoor fan 20 is disposed. In this implementation, the indoor fan 20 is located at the second air vent 17, and "at the second air vent 17" may be understood as a position in the second air vent 17 or a position that is in the second space 12 and that is adjacent to the second air vent 17. In this implementation, the position of the indoor fan 20 is combined with or associated with a position of the second air vent 17, and the indoor fan 20 may be directly fastened to the housing 10 without requiring a bracket structure.

Figure 8:
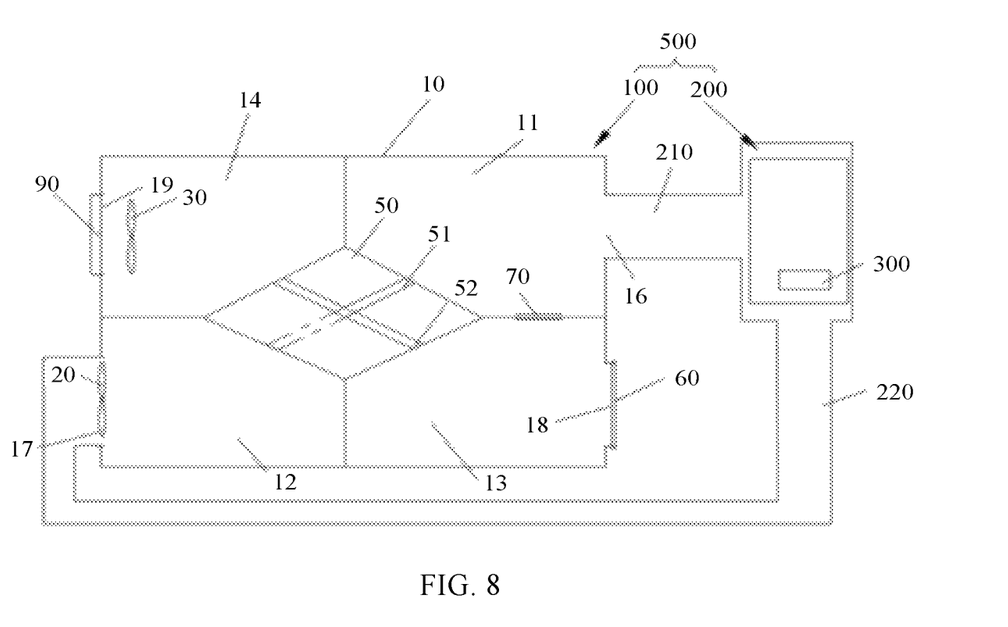
FIG. 8 is a schematic diagram of an indirect evaporative cooling apparatus according to an implementation of this application.

FIG. 8 shows a possible implementation of the indirect evaporative cooling apparatus 100 provided in this application. A difference between the indirect evaporative cooling apparatus 100 in this implementation and the indirect evaporative cooling apparatus 100 shown in FIG. 7 is that the indirect evaporative cooling apparatus 100 provided in this implementation further includes an outdoor air valve 90, and the outdoor air valve 90 is installed at the fourth air vent 19, and is configured to control opening and closing of the fourth air vent 19. When the indirect evaporative cooling apparatus 100 is in the normal heat dissipation operation mode, the outdoor air valve 90 is in an open state. When the indirect evaporative cooling apparatus 100 is in the filth removal mode, the outdoor air valve 90 is closed. When the fourth air vent 19 is blocked by the outdoor air valve 90, circulation in the outdoor circulation air duct is blocked. In this case, an air velocity in the third space 13 is reduced. This helps positive pressure from the first space 11 to the third space 13 to be generated at the bypass valve 70, so that an air flow flows from the first space 11 to the third space 13, to complete cleaning the filter 60.

Figure 9:
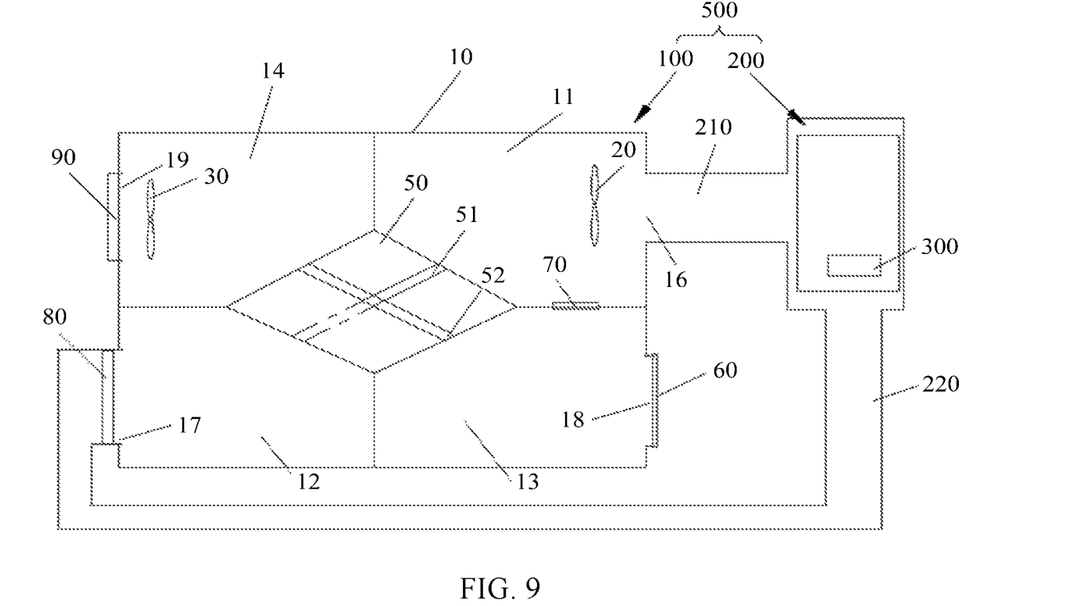
FIG. 9 is a schematic diagram of an indirect evaporative cooling apparatus according to an implementation of this application.

FIG. 9 shows a possible implementation of the indirect evaporative cooling apparatus 100 provided in this application. A difference between the indirect evaporative cooling apparatus 100 in this implementation and the indirect evaporative cooling apparatus 100 shown in FIG. 8 is that the indirect evaporative cooling apparatus 100 provided in this implementation further includes an indoor air valve 80, and the indoor air valve 80 is located at the second vent 17, and is configured to control opening and closing of the second air vent 17. The indoor fan 20 is disposed in the first space 11. When a filter cleaning operation is performed, the second air vent 17 is closed by using the indoor air valve 80. In this way, air circulation from the first space 11 to the second space 12 is blocked. In this case, when the indoor fan 20 in the first space 11 runs, air inside the first space 11 flows to the third space 13 through the bypass valve 70, to complete cleaning the filter. Certainly, in this implementation, the indoor fan 20 may be alternatively disposed in the second space 12 or at the second air vent 17.

The indoor air valve 80 and the outdoor air valve 90 may co-exist in a specific implementation, or one of the indoor air valve 80 and the outdoor air valve 90 may be used. In other words, in an implementation of this application, the indirect evaporative cooling apparatus 100 may include only the indoor air valve 80 or only the outdoor air valve 90.

Figure 10:
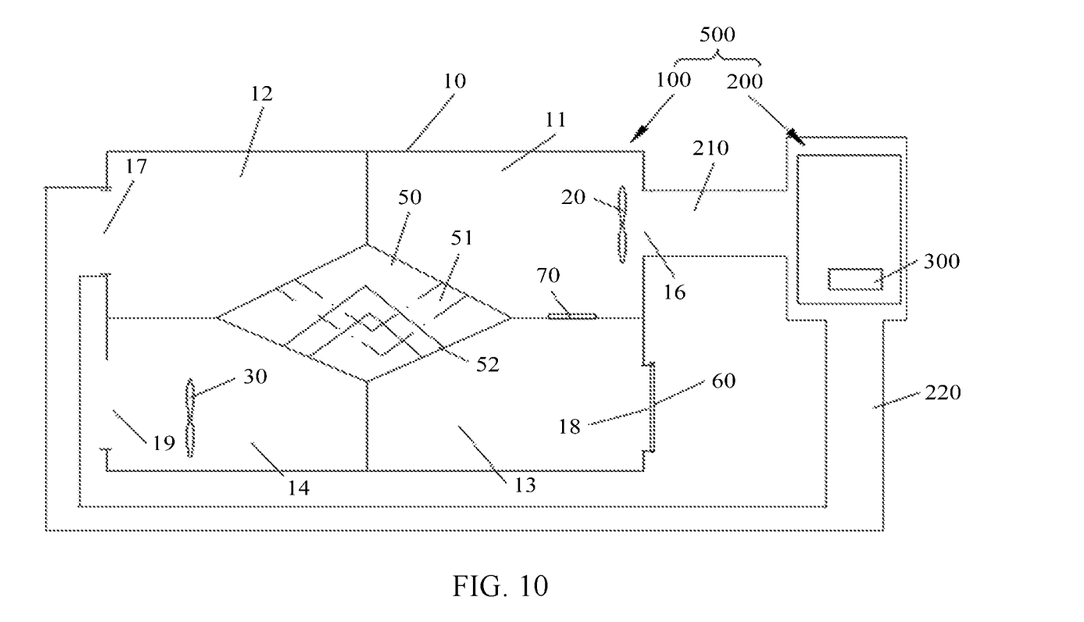
FIG. 10 is a schematic diagram of an indirect evaporative cooling apparatus according to an implementation of this application.

FIG. 10 shows a possible implementation of the indirect evaporative cooling apparatus 100 provided in this application. A difference between the indirect evaporative cooling apparatus 100 in this implementation and the indirect evaporative cooling apparatus 100 shown in FIG. 1 is that in this implementation, positions of the second space 12 and the fourth space 14 are transposed. The first space 11, the second space 12, the fourth space 14, and the third space 13 are counterclockwise distributed around the heat exchanger core 50. It should be noted that the first space 11 and the third space 13 are also adjacent to each other in this embodiment. In this case, the bypass valve 70 is disposed between the first space 11 and the third space 13, to facilitate air circulation between the first space 11 and the third space 13. The first channel 51 of the heat exchanger core 50 is connected between the first space 11 and the second space 12, the second channel 52 of the heat exchanger core 50 is connected between the third space 13 and the fourth space 14, and there is an overlapping area between the first channel 51 and the second channel 52. In FIG. 10, a dash-dotted line represents the first channel 51, and a solid line represents the second channel 52. A specific structural form of the heat exchanger core 50 is not limited in this application. In this implementation, the first air vent 16 and the second air vent 17 on the housing 10 are disposed opposite to each other, and the third air vent 18 and the fourth air vent 19 are disposed opposite to each other. The outdoor fan 30 is still disposed in the fourth space 14.

Figure 11:
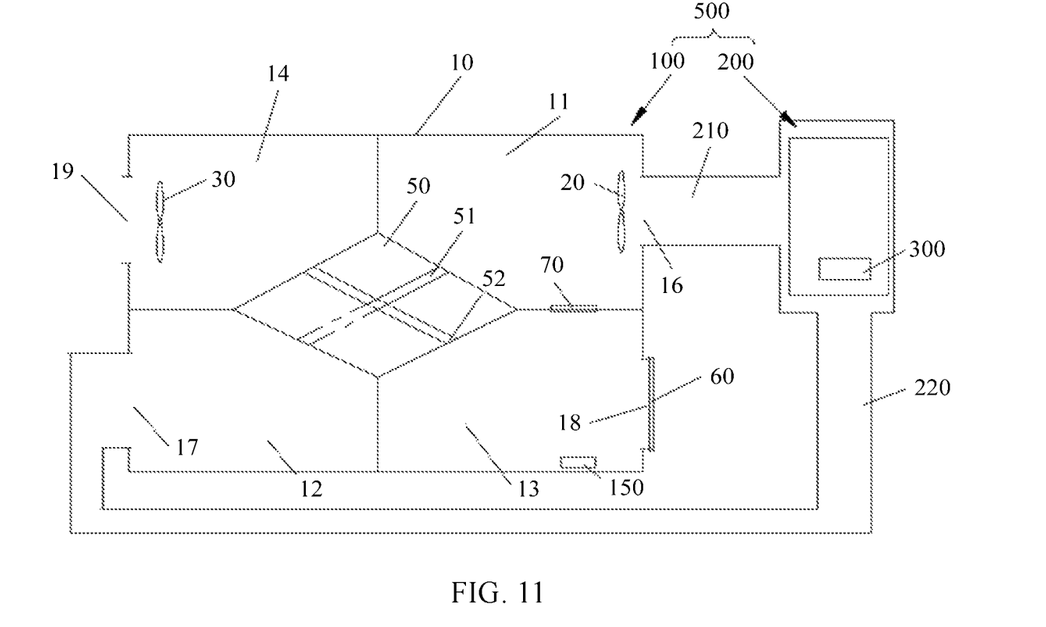
FIG. 11 is a schematic diagram of an indirect evaporative cooling apparatus according to an implementation of this application.

In the implementation shown in FIG. 11, in this application, a filth blockage monitor 150 may be disposed inside the indirect evaporative cooling apparatus 100, to send a signal to the control center when filth blockage occurs on the filter 60. The filth blockage monitor 150 is configured to detect filth blockage of the filter. When detecting that the filth blockage affects normal operation of the normal outdoor circulation air duct, the filth blockage monitor 150 sends a signal to the control center, so that the control center enables the filth removal mode. In an implementation, the filth blockage monitor 150 is a differential pressure sensor, the filth blockage monitor 150 is disposed in the third space 13, and the filth blockage monitor 150 can detect atmospheric pressure in the third space 13. If the filter 60 at the third air vent 18 corresponding to the third space 13 is blocked, and the outdoor fan 30 still runs, air in the third space 13 is continuously pumped to the fourth space 14, and less air is supplemented from the third air vent 18 (or no air enters the third space 13 from the third air vent 18), and consequently, negative pressure is formed in the third space 13. After detecting the negative pressure in the third space 13, the filth blockage monitor 150 sends an electrical signal to the control center, to indicate, to the control center, that the filth removal mode needs to be enabled for the indirect evaporative cooling apparatus 100. In another implementation, the filth blockage monitor 150 is a light transmittance sensor, and the filth blockage monitor 150 detects filth blockage of the filter 60 based on light transmittance of the filter 60. Specifically, if the filter 60 is blocked due to dust or the like, light transmittance is reduced. Lower light transmittance means more serious filth blockage. When the light transmittance reaches a predetermined value, the filth blockage monitor 150 sends an electrical signal to the control center, and the control center enables the filth removal mode.

Figure 12:
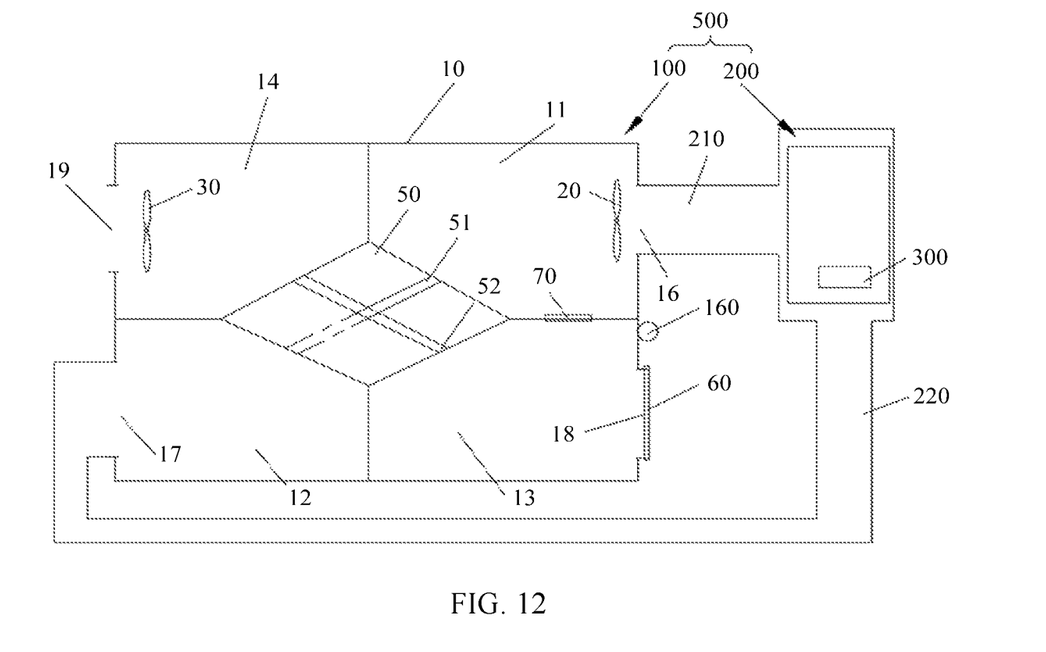
FIG. 12 is a schematic diagram of an indirect evaporative cooling apparatus according to an implementation of this application.

In another implementation, refer to FIG. 12. Alternatively, a monitoring apparatus 160 disposed on an outer surface of the housing 10 of the indirect evaporative cooling apparatus 100 may monitor filth blockage of the filter 60. For example, a camera is installed on the outer surface of the housing 10, and the camera monitors the filter 60 in real time to determine whether filth blockage occurs.

It should be noted that the control center herein may be a control circuit disposed on a circuit board inside the indirect evaporative cooling apparatus 100. The control center may be alternatively disposed outside the indirect evaporative cooling apparatus 100, and the indirect evaporative cooling apparatus 100 is operated through remote control. For example, the control center may be a control circuit in the data center or a circuit in another terminal device. In an implementation, the control center 300 disposed in the data center 200 controls an operation mode of the indirect evaporative cooling apparatus 100 in this application. The control center 300 has a similar circuit structure to a central processing unit or the like. The operation mode of the indirect evaporative cooling apparatus 100 may be selected by using the control center 300.

Specifically, in a possible implementation, the control center 300 is electrically connected to the filth blockage monitor 150 in the indirect evaporative cooling apparatus 100. The control center 300 is configured to receive an electrical signal of the filth blockage monitor 150. When the electrical signal falls within a preset range, the control center 300 controls the indirect evaporative cooling apparatus 100 to be in the heat dissipation operation mode; or when the electrical signal falls beyond the preset range, the control center 300 controls the indirect evaporative cooling apparatus 100 to be in the filth removal operation mode of the filter 60.

Switching may be performed between the two operation modes of the indirect evaporative cooling apparatus 100. A switching occasion is selected by the control center 300. When the indirect evaporative cooling apparatus 100 is in the normal heat dissipation operation mode, filth such as dust is continuously adsorbed on the filter 60. However, there is no need to switch the operation mode immediately when filth is adsorbed on the filter 60. In this case, a filth blockage degree of the filter 60 needs to be determined. The heat dissipation mode is switched to the filth removal mode only when the filth blockage affects normal heat dissipation performed by the indirect evaporative cooling apparatus 100 for the data center 200. A specific filth blockage degree may be obtained through a signal analysis by the control center 300. For example, the signal received by the control center 300 is about atmospheric pressure in the third space 13. When the atmospheric pressure value reaches a preset range, it indicates that the filth blockage is serious and the heat dissipation mode needs to be switched to the filth removal operation mode. Similarly, if the received signal is about light transmittance at the third air vent 18, when the light transmittance reaches a preset range, it indicates that the filth removal operation mode needs to be enabled for filth blockage.

After determining that the filth removal operation mode needs to be enabled, the control center 300 performs coordinated control on components such as the indoor fan 20, the outdoor fan 30, the bypass valve, the indoor air valve 80 (if existent), and the outdoor air valve 90 (if existent) in the indirect evaporative cooling apparatus 100, to ensure that an air flow in the first space 11 enters the third space 13, and an air flow in the third space 13 flows out from the third air vent 18.

According to another aspect, this application provides a control method for an operation mode of the foregoing indirect evaporative cooling apparatus 100. The method specifically includes the following:

Filth blockage of a filter 60 is monitored. Monitoring herein is mainly completed through cooperation of a filth blockage monitor 150 and a control center 300. The filth blockage monitor 150 sends a monitored signal to the control center 300, and the control center 300 performs a signal analysis. Specifically, the filth blockage monitor 150 may be a differential pressure sensor, and can collect an atmospheric pressure signal inside a third space 13, and then send the collected atmospheric pressure signal to the control center 300 for analysis processing.

When the filth blockage falls within a preset range, the indirect evaporative cooling apparatus 100 is controlled to be in a heat dissipation operation mode. After receiving the monitored signal sent by the filth blockage monitor 150, the control center 300 performs analysis processing on the monitored signal to determine the operation mode. Specifically, if the atmospheric pressure signal that is received by the control center 300 and that is sent by the differential pressure sensor (the filth blockage monitor 150) falls within a preset range of the third space 13, it indicates that the filth blockage of the filter 60 is not serious, and correspondingly, the indirect evaporative cooling apparatus 100 should remain in the heat dissipation operation mode, and a filth removal operation mode does not need to be enabled.

When the filth blockage falls beyond the preset range, a rotation speed of an outdoor fan 30 is controlled to be reduced or the outdoor fan 90 is controlled to stop running, and a bypass valve 70 is opened, so that wind in an indoor circulation air duct 110 enters the third space 13 through the bypass valve 70 and blows toward the filter 60. In a possible implementation, when the pressure change falls beyond the preset range, a rotation speed of an indoor fan may be increased to improve cleaning efficiency of the filter.

In a specific embodiment, when the control center 300 determines, after receiving the monitored signal sent by the filth blockage monitor 150, that the filth blockage falls beyond the preset range, a timing module (not shown in the figure) is enabled, and filth removal operation time is preset for the timing module. Within the preset time, the indirect evaporative cooling apparatus 100 enters the filth removal operation mode. Specifically, the rotation speed of the outdoor fan 30 in the indirect evaporative cooling apparatus 100 is reduced or the outdoor fan 30 stops running, the bypass valve 70 is opened, and an indoor air valve 80 (if existent) and an outdoor air valve 90 (if existent) are closed. After the filth removal mode has been enabled for the preset time, the timing module 310 sends a filth removal stop instruction to the control center 300. In this case, the control center 300 controls the indirect evaporative cooling apparatus 100 to enter the heat dissipation operation mode again. Specifically, the outdoor fan 30 in the indirect evaporative cooling apparatus 100 is opened, the bypass valve 70 is closed, and the indoor air valve 80 (if existent) and the outdoor air valve 90 (if existent) are opened.

In another specific embodiment, after the indirect evaporative cooling apparatus 100 enters the filth removal operation mode, the rotation speed of the outdoor fan is controlled to be reduced or the outdoor fan is controlled to stop running, and the bypass valve is opened, a pressure value in the third space is continuously monitored; and when the pressure value changes and falls within a safe range, the bypass valve is closed, and the outdoor fan is opened or the rotation speed of the outdoor fan is restored. The safe range is included in the preset range, and a boundary value of the safe range is less than a boundary value of the preset range. When the differential pressure sensor detects that the pressure value in the third space changes and falls within the safe range, it indicates that filth on the filter has been cleaned up or a cleaning degree meets an operation requirement. In this case, the bypass valve is closed, and the outdoor fan is opened or the rotation speed of the outdoor fan is restored. In this case, the indirect evaporative cooling apparatus is switched from the cleaning mode to the normal heat dissipation mode. The filth blockage monitor 150 continuously sends a monitored signal to the control center 300. Specifically, when the filth blockage monitor 150 is a differential pressure sensor, continuous pressure signals are received by the control center 300, and the control center 300 determines whether pressure values represented by these pressure signals meet the safe range. If the control center 300 determines that the pressure signal falls within the safe range, it indicates that the filth removal operation on the filter 60 is completed. The control center 300 opens the outdoor fan 30, the indoor air valve 80 (if existent) and the outdoor air valve 90 (if existent), and closes the bypass valve 70.

The foregoing describes in detail the indirect evaporative cooling apparatus and the related technical solutions provided in embodiments of this application. Specific examples are used in this specification to describe the principle and embodiments of this application. The foregoing descriptions of embodiments are merely used to help understand the methods and core ideas of this application. In addition, a person of ordinary skill in the art may change a specific embodiment and an application scope according to the idea of this application. In conclusion, content of this specification should not be construed as a limitation of this application.

What is claimed is:

1. An indirect evaporative cooling apparatus, comprising:
a housing;
a heat exchanger core disposed in the housing, wherein the heat exchanger core and the housing form a first space, a second space, a third space, and a fourth space, wherein the first space and the second space are connected by using the heat exchanger core to constitute an indoor circulation air duct, and wherein the third space and the fourth space are connected by using the heat exchanger core to constitute an outdoor circulation air duct;
a first air vent disposed in the housing and connecting the first space and the outside of the housing;
a second air vent disposed in the housing and connecting the second space and the outside of the housing;
a third air vent disposed in the housing and connecting the third space and the outside of the housing;
a fourth air vent disposed in the housing and connecting the fourth space and the outside of the housing;
an indoor fan disposed in the indoor circulation air duct and configured to direct air from the first space towards the second space;
an outdoor fan disposed in the outdoor circulation air duct and configured to direct air from the third space towards the fourth space;
a filter disposed at the third air vent; and
a bypass valve disposed between the first space and the third space and configured to allow air to pass from the indoor circulation air duct, through the bypass valve, to the third space, towards the filter and through the third air vent.

2. The indirect evaporative cooling apparatus of claim 1, wherein the indoor fan is located in the first space.

3. The indirect evaporative cooling apparatus of claim 1, wherein the indoor fan is located at the first air vent.

4. The indirect evaporative cooling apparatus of claim 1, wherein the indoor fan is located in the second space.

5. The indirect evaporative cooling apparatus of claim 1, wherein the indoor fan is located at the second air vent.

6. The indirect evaporative cooling apparatus of claim 1, wherein the outdoor fan is located in the fourth space.

7. The indirect evaporative cooling apparatus of claim 2, wherein the outdoor fan is located in the fourth space.

8. The indirect evaporative cooling apparatus of claim 1, wherein the outdoor fan is located at the fourth air vent.

9. The indirect evaporative cooling apparatus of claim 2, wherein the outdoor fan is located at the fourth air vent.

10. The indirect evaporative cooling apparatus of claim 1, further comprising an outdoor air valve disposed at the fourth air vent and configured to control opening and closing of the fourth air vent.

11. The indirect evaporative cooling apparatus of claim 2, further comprising an outdoor air valve disposed at the fourth air vent and configured to control opening and closing of the fourth air vent.

12. The indirect evaporative cooling apparatus of claim 1, further comprising an indoor air valve disposed at the second air vent and configured to control opening and closing of the second air vent.

13. The indirect evaporative cooling apparatus of claim 1, wherein the first space, the fourth space, the second space, and the third space are counterclockwise distributed around the heat exchanger core.

14. The indirect evaporative cooling apparatus of claim 1, wherein the first space, the second space, the fourth space, and the third space are counterclockwise distributed around the heat exchanger core.

15. The indirect evaporative cooling apparatus of claim 1, further comprising a filth blockage monitor disposed in the third space and configured to send a signal to a control center when filth blockage occurs on the filter.

16. The indirect evaporative cooling apparatus of claim 15, wherein the filth blockage monitor comprises a differential pressure sensor or a light transmittance sensor.

17. A cooling system, comprising:
an indirect evaporative cooling apparatus comprising:
a housing;
a heat exchanger core disposed in the housing, wherein the heat exchanger core and the housing form a first space, a second space, a third space, and a fourth space, wherein the first space and the second space are connected by using the heat exchanger core to constitute an indoor circulation air duct, and wherein the third space and the fourth space are connected by using the heat exchanger core to constitute an outdoor circulation air duct;
a first air vent disposed in the housing and connecting the first space and the outside of the housing;
a second air vent disposed in the housing and connecting the second space and the outside of the housing;
a third air vent disposed in the housing and connecting the third space and the outside of the housing;
a fourth air vent disposed in the housing and connecting the fourth space and the outside of the housing;
an indoor fan disposed in the indoor circulation air duct and configured to direct air from the first space towards the second space;
an outdoor fan disposed in the outdoor circulation air duct and configured to direct air from the third space towards the fourth space;
a filter disposed at the third air vent; and
a bypass valve disposed between the first space and the third space and configured to allow air to pass from the indoor circulation air duct, through the bypass valve, to the third space, towards the filter and through the third air vent; and
a control center configured to control an operation mode of the indirect evaporative cooling apparatus.

18. The cooling system of claim 17, wherein the indirect evaporative cooling apparatus further comprises a filth blockage monitor electrically connected to the control center, and wherein the control center is configured to:
receive a monitor signal from the filth blockage monitor;
control, when the monitor signal falls within a preset range, the indirect evaporative cooling apparatus to be in a heat dissipation operation mode; and
control, when the monitor signal falls beyond the preset range, the filter to be in a filth removal operation mode.

19. The cooling system of claim 18, wherein when the monitor signal falls beyond the preset range, the control center is further configured to:
control the outdoor fan to stop running; and
open the bypass valve configured to allow air to pass from the indoor circulation air duct, through the bypass valve, to the third space and toward the filter.

20. The cooling system of claim 17, wherein the first space, the fourth space, the second space, and the third space are counterclockwise distributed around the heat exchanger core or clockwise distributed around the heat exchanger core.

* * * * *